(12) United States Patent
Brow

(10) Patent No.: US 11,763,246 B2
(45) Date of Patent: Sep. 19, 2023

(54) DEVICE FOR USE WITH AN AUTOMATED SECURED PACKAGE DELIVERY SYSTEM

(71) Applicant: Georges Raymond Brow, Georgetown Royalty (CA)

(72) Inventor: Georges Raymond Brow, Georgetown Royalty (CA)

(*) Notice: Subject to any disclaimer, the term of this patent is extended or adjusted under 35 U.S.C. 154(b) by 204 days.

(21) Appl. No.: 17/119,320

(22) Filed: Dec. 11, 2020

(65) Prior Publication Data

US 2021/0383319 A1 Dec. 9, 2021

(51) Int. Cl.
| | |
|---|---|
| *G06Q 10/08* | (2023.01) |
| *G06Q 10/0833* | (2023.01) |
| *G06K 7/10* | (2006.01) |
| *G06K 7/14* | (2006.01) |
| *G06K 19/06* | (2006.01) |
| *G06K 19/077* | (2006.01) |

(52) U.S. Cl.
CPC ..... *G06Q 10/0833* (2013.01); *G06K 7/10366* (2013.01); *G06K 7/1413* (2013.01); *G06K 7/1417* (2013.01); *G06K 19/06028* (2013.01); *G06K 19/06037* (2013.01); *G06K 19/07758* (2013.01)

(58) Field of Classification Search
CPC ........... G06Q 10/0833; G06K 7/10366; G06K 7/1413; G06K 7/1417; G06K 19/06028; G06K 19/06037; G06K 19/07758
USPC ........................................................ 235/385
See application file for complete search history.

(56) References Cited

U.S. PATENT DOCUMENTS

| | | | |
|---|---|---|---|
| 8,010,462 B2 | 8/2011 | Kinori et al. | |
| 10,121,118 B1 | 11/2018 | Kim et al. | |
| 10,902,375 B2 | 1/2021 | Wilkinson et al. | |
| 2015/0102903 A1* | 4/2015 | Wilkinson | A47G 29/141 340/5.61 |
| 2017/0286905 A1 | 10/2017 | Richardson et al. | |
| 2021/0045563 A1* | 2/2021 | Bartley-Clark | A47G 29/141 |

FOREIGN PATENT DOCUMENTS

CA 2855757 6/2013

* cited by examiner

*Primary Examiner* — Jamara A Franklin

(57) ABSTRACT

A device for use in conjunction with a parcel receptacle apparatus in an automated secured package delivery system. When an item is delivered to a purchaser of the item, a simultaneous confirmation of the delivery and the status of the item is sent to each of the purchaser and a shipper of the item over a network, and immediately informs both a purchaser and shipper of situations where delivery items are placed which are too large to be accommodated within the parcel receptacle apparatus.

13 Claims, 4 Drawing Sheets

DEVICE FOR USE WITH AN AUTOMATED SECURED PACKAGE DELIVERY SYSTEM

FIELD OF THE INVENTION

The present invention relates to a device for use with an automated secured package delivery system, and, more particularly, to a device for use in conjunction with a parcel receptacle apparatus in an automated secured package delivery system, which can provide simultaneous confirmation and data to the purchaser, shipper and others, if desired, and which can immediately inform both a purchaser and shipper of situations where delivery items are placed at a point of delivery which are too large to be accommodated within the parcel receptacle apparatus (a container).

DESCRIPTION OF THE PRIOR ART

It is well known that parcel or package delivery services have become commonplace in recent years, however in some cases these services have difficulty delivering to individual homes as, for example, the occupant of the home is often not there at the time of delivery and thus a carrier may have to visit the home multiple times to effect delivery. In other situations, a parcel delivery person may leave a parcel unattended, which may be stolen, causing inconvenience for the occupant and cost for the retailer. As such, parcel theft and the security of parcels/packages has become a challenge for both retailers and consumers.

It is known that some retailers have resorted to placing containers at a predetermined location, such as a grocery store or post office. The parcel recipient then receives a message that the parcel has been delivered to the predetermined location. The parcel recipient then travels to and retrieves the parcel from the predetermined location. However, this can be inconvenient to the purchaser. In other situations it is also known to place package/parcel deliveries in a lockable container present at a home upon delivery. However, this generally requires manual locking and unlocking of such a container which may not be convenient for either the delivery person or a purchaser, who may wish to have someone else retrieve the delivered package sooner than when the purchaser returns to the home. Further such systems do not provide each of the shipper and purchaser with definitive confirmation that safe and secure delivery has been effected. Moreover, such systems do not also provide the use of a device which can safely and immediately inform both a purchaser and shipper of situations where delivery items are placed at a point of delivery which are too large to be accommodated within a container for such receiving purposes.

Accordingly, there is a need for a device for use with an automated secured package delivery system, and, more particularly, to a device for use in conjunction with a parcel receptacle apparatus in an automated secured package delivery system, which can provide simultaneous confirmation and data to the purchaser, shipper and others, if desired, and which can immediately inform both a purchaser and shipper of situations where delivery items are placed at a point of delivery which are too large to be accommodated within a container. To this end, the present invention effectively addresses this need.

SUMMARY OF THE INVENTION

A general object and advantage of the present invention is to provide an improved device for use with an automated secured package delivery system, which can safely and immediately inform both a purchaser and shipper of situations where delivery items are placed at a point of delivery which are too large to be accommodated within a container.

A still further object and advantage of the present invention is to provide an improved device for use in conjunction with a parcel receptacle apparatus in an automated secured package delivery system which can provide simultaneous confirmation and data to the purchaser, shipper and others, if desired.

A still further object and advantage of the present invention is to provide an improved automated secured package delivery system, and an apparatus for receiving a delivery item, which can receive and protect temperature and humidity sensitive packages and to record and transmit status of said package, and which has anti-vandal and anti-theft features.

According to one aspect of the present invention, there is provided an automated package delivery system utilizing a device comprising the steps of delivering an item to a purchaser accessible entity for a purchaser of the item, the purchaser accessible entity and the device being constructed and arranged to be accessible over a network and in communication with each other; delivering to at least each of the purchaser and a shipper of the item a confirmation of the delivery of the item over the network; and wherein, when the item to be delivered exceeds a capacity of the purchaser accessible entity to be stored therein, the item can be positioned proximate to the purchaser accessible entity and detectable by the device, and the purchaser and the shipper of the item are notified of the non-secure delivery of the item over the network when within a pre-set range.

According to another aspect of the present invention, there is provided an automated package delivery system utilizing a device comprising the steps of delivering an item to a purchaser accessible entity for a purchaser of the item, the purchaser accessible entity and the device being constructed and arranged to be accessible over a network and in communication with each other; delivering to at least each of the purchaser and a shipper of the item a confirmation of the delivery of the item over the network; providing at least one of an RFID tracking tag and NFC tracking tag to the item; and wherein, when the item to be delivered exceeds a capacity of the purchaser accessible entity to be stored therein, the item can be positioned proximate to the purchaser accessible entity and detectable by the device, and the purchaser and the shipper of the item are notified of the non-secure delivery of the item over the network when within a pre-set range.

According to another aspect of the present invention, there is provided a device for confirming delivery of a delivery item to a package receptacle apparatus at a site proximate to the apparatus, the device comprising a processor; a network connection in communication with the processor; and a confirmation module in communication with the processor and the network connection for delivering to at least each of a purchaser and a shipper of the delivery item a confirmation of the delivery of the delivery item to the site proximate to the apparatus.

According to a still further aspect of the present invention, there is provided a kit for providing an automated package delivery system comprising a purchaser accessible entity for a purchaser of a delivery item; a device for confirming delivery of the delivery item to the purchaser accessible entity at a site proximate to the purchaser accessible entity, the purchaser accessible entity and the device being constructed and arranged to be accessible over a network and in communication with each other, and being operably able to deliver to at least each of the purchaser and a shipper of the delivery item a confirmation of the delivery item over the network; and wherein, when the delivery item to be delivered exceeds a capacity of the purchaser accessible entity to be stored therein, the delivery item can be positioned proximate to the purchaser accessible entity and detectable by the device, and the purchaser and the shipper of the delivery item are notified of the non-secure delivery of the delivery item over the network when within a pre-set range.

BRIEF DESCRIPTION OF THE DRAWINGS

A preferred embodiment of the present invention is described below with reference to the accompanying drawings, in which.

DESCRIPTION OF THE PREFERRED EMBODIMENT

The present invention relates to a device for use with an automated secured package delivery system that can provide simultaneous confirmation to the purchaser, shipper and others of the delivery of an item, if desired, and which can immediately inform both a purchaser and shipper of situations where delivery items are placed at a point of delivery which are too large to be accommodated within a receptacle container for use with the automated secured package delivery system.

Figure 1:
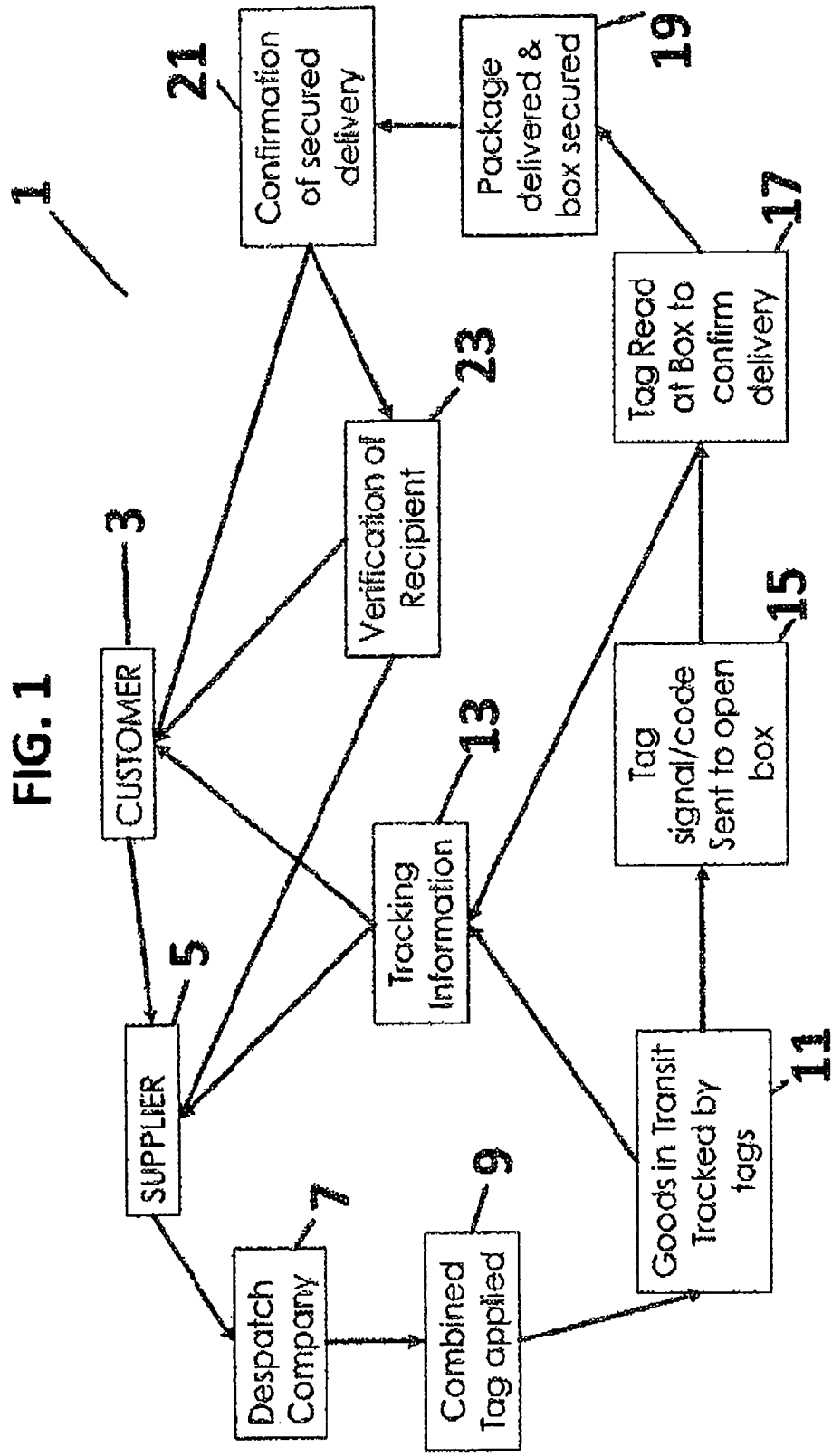
FIG. 1 illustrates a first embodiment of the automated secured package delivery system and weathertight receptacle apparatus of the present invention.
Figure 2:
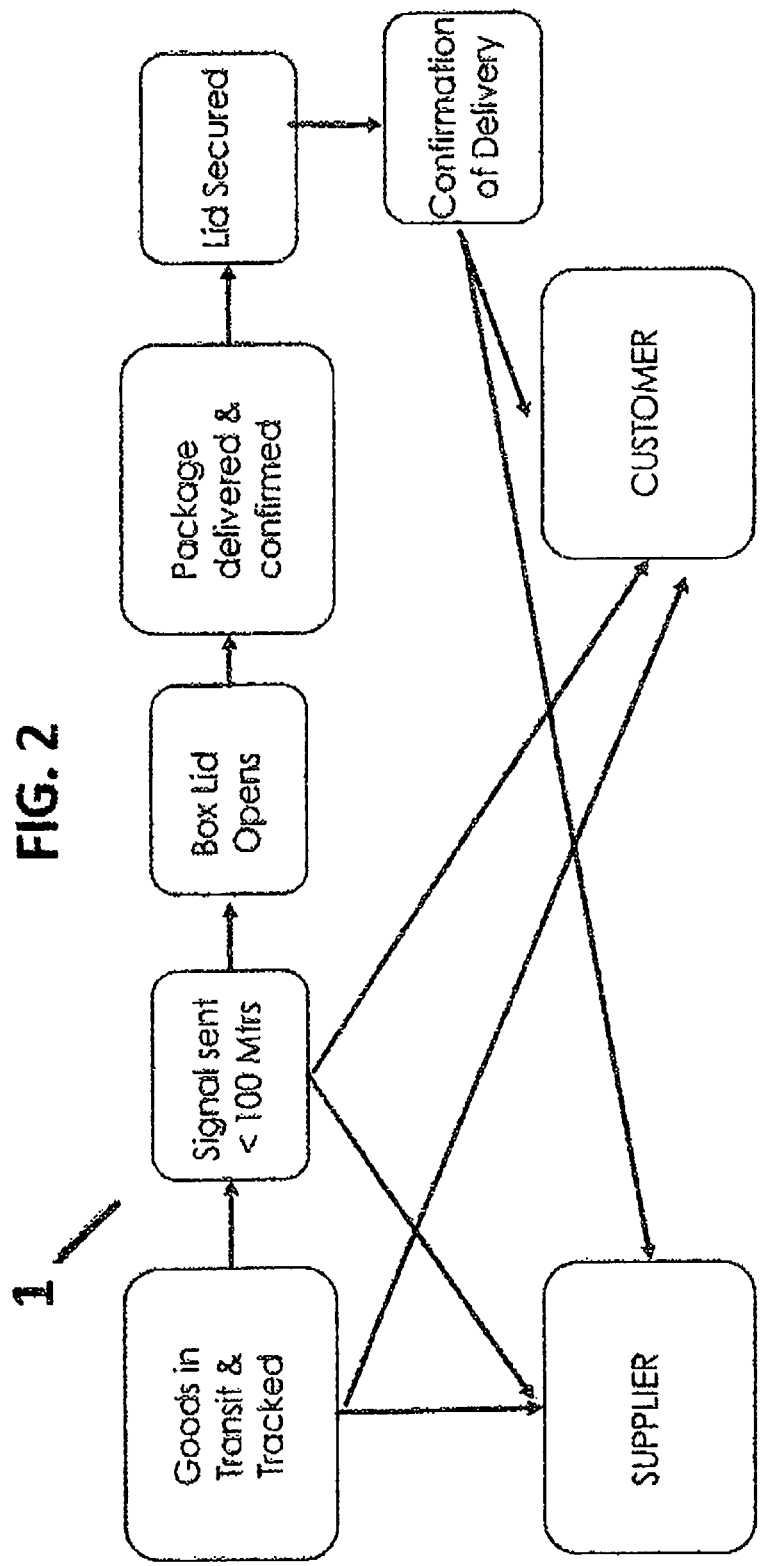
FIG. 2 illustrates an overview of the arrival of the delivery of the delivered item to the receptacle apparatus of the present invention.
Figure 3:
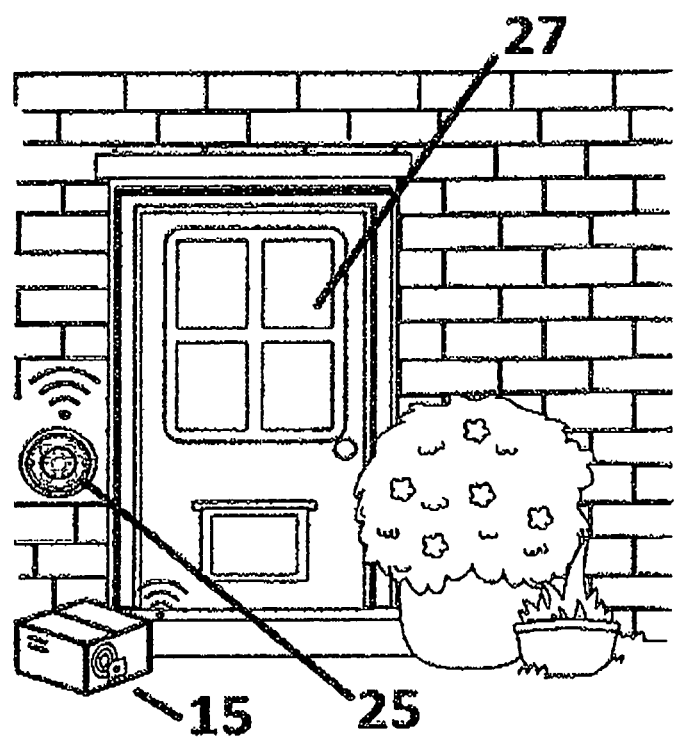
FIG. 3 illustrates an embodiment of a device for use in conjunction with the receptacle apparatus in the automated secured package delivery system of the present invention.

With reference now to the drawings, and in particular to FIGS. 1 and 2, the automated package delivery system, generally designated by the reference numeral 1 in FIG. 1, will firstly now be described, with the device 25 (as seen in FIG. 3) for use in conjunction with such system being described shortly. It will be understood however, that both the device for use in conjunction with the parcel receptacle apparatus in the automated secured package delivery system, will each have the same features, unless otherwise noted.

As seen in FIG. 1, the customer 3, places an order for a delivery item that is received by the supplier/distributor 5, who then, in one embodiment, forwards the order to a dispatch company 7, who will later forward this order to the customer 3. It will be understood however, that the supplier can merely dispatch such an order themselves, such as through a shipping arm of their own organization, such as Amazon utilizes, for example. Once this order has been placed, a package for shipping is prepared sporting, in one embodiment, an RFID (radio frequency identification) tracking tag, or, in an exemplary embodiment, a combination of an RFID tracking tag and NFC tracking tag (near field communication (NFC) both of which are a wireless radio communications standard. GPS tracking, bar codes, etc. could also be utilized.

It is well known that retailers and parcel shipping companies in particular prefer, as an example, barcodes and RFID as a way to keep tabs on inventory supplies and shipments, as they can be encoded with a unique code.

Once the delivery item is en route 11 to its destination 27, the tracking tags 9 then provide the tracking (shipment) information 13 to each of the purchaser/customer 3, and the shipper/supplier 5. It will be understood that, with respect to the present invention, delivering an item entails shipping an item 17 to a purchaser accessible entity for a purchaser of the item 17, such as a container apparatus, bag or the like, which could be located at, but is not limited to, a house, an apartment, a mailbox, a lockbox, a vehicle or a place of employment.

It will also be understood that the delivery system of the present invention, and apparatus therefor (as well as the device 25 designed as a separate entity for use with such system, as seen in FIG. 3), is electronically connected to each other and the Internet and/or other communications systems via wifi, radio, router, bluetooth, etc., for example, through means of an accessible network and processor interconnected therewith. In respect of both the apparatus/receptacle 15 and the device 25, it will be understood that these two units can each be supplied with battery power, or hard wired for electrical power supply.

It will also be understood that, in one embodiment, the delivery apparatus/receptacle 15 further comprises a door to allow access to an interior part of the apparatus and comprises an accessible lock, which can either be opened by keypad access using a PIN number, for example, or a manual locking device, and that the apparatus could come in numerous sizes and variations, as would be apparent to one skilled in the art. It will also be understood that access to the delivery receptacle 15 containing the delivered item 17 can be via a key, a manually typed code, an RFID or similar encoded tag (NFC tracking tag), biometrically scanned fingerprint, iris reading or the like; or other data transfer system or recipient recognition device that will unlock the delivery apparatus/receptacle 15.

In an exemplary embodiment, once a courier company or other transport mode (even a drone) carries the delivery item 17 to the destination, once this item is within, for example only, 100 meters of the destination 27 the customer's delivery apparatus, as well as device 25, senses the impending delivery by means of the tracking tag(s) sensed by the purchaser's network connection. In such manner, the delivery item 17 is identified by this tracking code sent to the customer 3 upon placement of the order. At this point, the delivery service using the tracking tags is notified that there is a delivery item 17 at the customer's location 27, whereupon the electronic tag signal activates a switch to unlock the apparatus 15, whereby the delivery item 17 can be delivered by the delivery service.

Once delivery has occurred, the tracking tags confirm the delivery of the item 17, whereby, through the network and processor associated with the receptacle apparatus 15, the receptacle apparatus 15 receiving the item 17 may be closed and locked 19. When a confirmation module of the processor can confirm that secured delivery 21 has been effected, the network connection delivers a verification of the recipient 23 to each of the customer 3 and the shipper 5. It will be understood that, the delivered item 17 must be confirmed to be in the receptacle apparatus 15, through the NFC or RFID, before it can be locked. After the container is locked, the network connection then delivers a verification of the recipient 23 to each of the customer 3 and the shipper 5.

In an exemplary embodiment, if the item 17 to be delivered arrives and the container/apparatus 15 (or bag or the like) is full and the package (or packages) is too large in size to be delivered within such a container/apparatus 15 (even if it possesses multiple compartments within), the item can be laid beside the container/apparatus 15. The RFID tag (since RFID-radio frequency identification is a form of wireless communication that incorporates the use of electromagnetic or electrostatic coupling in the radio frequency portion of the electromagnetic spectrum to uniquely identify an object) on the parcel/item to be delivered is operably able to communicates with the container 15 and the device 25, (or bag or the like) when it is within a desired range for example, under 1.5 or 5 ft, though of course variations to this range are possible). The container/apparatus 15, and the device 25, in such circumstances, can identify the parcel/item 17 to be delivered and, based on what was described previously herein, is able to ascertain exactly what the parcel/item 17 being delivered is, where it came from, and who it is to be delivered to, (in the exact same manner for deliveries placed within the container/apparatus 15, as previously described herein). In this situation, the customer and shipper (eg. Walmart, Loblaws or Amazon, for example purposes only) are notified of the successful delivery and that the item 17 itself has been delivered unsecured, and is not in the container/apparatus 15.

In this embodiment, the container/apparatus 15 will emit, for example, an intermittent, continuous signal (such as beeping) indicating that the externally placed package is still within the desired range of the container/apparatus 15. It should be noted that, in this situation, the onus is on the customer to retrieve the item immediately in such an unsecured delivery scenario. In the event that this externally placed package is removed by anyone not having or utilizing the previously described means of access to the container/receptacle 15, then an alarm (audible and/or otherwise) will sound and the customer and shipper of the item will be immediately advised via the network connection by either of the container/receptacle 15 or, more preferably, device 25. If there is surveillance video at the delivery site at the time of theft, any particulars thereof will be noted on the video/camera recording for later retrieval by either (or both) of container/receptacle 15 or device 25.

In an exemplary embodiment, the apparatus 15 or device 25 (or both) further comprises a camera (whether within the apparatus 15 or device 25, or remotely located within proximity of each of these) in communication with each of the processor and the network connection, whereby, once delivery has been effected, the camera delivers to at least each of the purchaser 3 and the shipper a confirmation of the delivery of the delivery item 17, which is sent over the network connection, to provide a visual proof of the delivery of the delivery item 17.

In an alternative embodiment proof of delivery that can be sent by either the apparatus 15 or device 25 can include a packet of information including the temperature & humidity within the container apparatus 15 from time of delivery to the moment the container apparatus 15 is opened by the authorized person. Expanding upon this embodiment, the container apparatus 15 can be environmentally controlled (heat, cooled and/or humidity), whereby the container apparatus 15, by means of the processor and its connection to the network, can be remotely activated by any of the shipper or recipient 3 to ready the container's internal environment for packages requiring a climate controlled environment. Moreover, the device 25 can further comprise a temperature reader, to monitor the internal temperature of apparatus 15.

Further, the container's environment history can be sent to any of the recipient 3 and shipper by either the apparatus 15 or device 25 via the network connection (to verify that conditions for such a delivery item 17 were maintained while in the apparatus 15.

In addition, a barcode or a "smart chip" could also be printed and placed on the exterior of the delivery item 17, to aid in the shipping/scanning process. In a further embodiment, the system and apparatus of the present invention (as well as the device 25 for use in conjunction therewith) could encompass anti-vandal and anti-theft features, whereby an alarm would sound, for example, if unauthorized retrieval of the delivery item 17 is attempted, and notification of such could be sent over the network to any of the recipient 3 and shipper by either the apparatus 15 or device 25.

Figure 4:
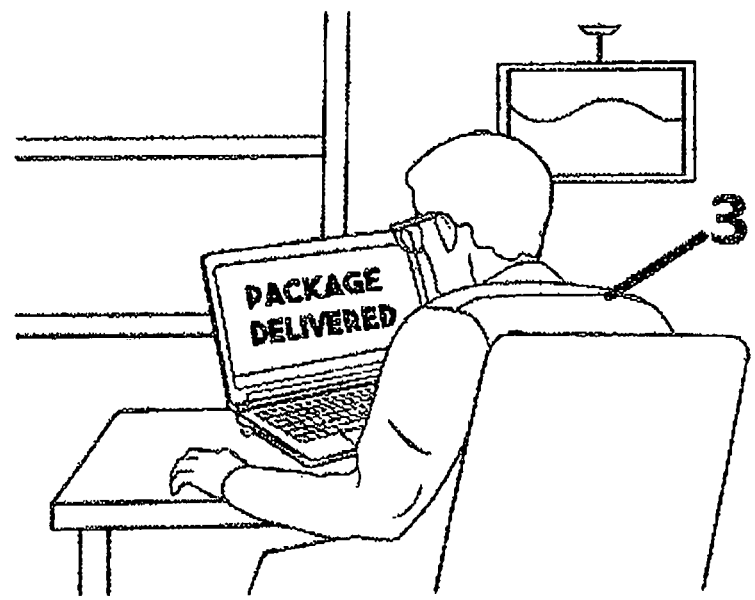
FIG. 4 illustrates an embodiment of a user receiving confirmation of the delivery of a delivery item over the network.

As previously noted, the automated secured package delivery can comprise delivery of a package/item without delivery to a securable apparatus 15, enclosure, container or the like. Delivery of the item 17 could be placed near/proximate to a stand-alone, Internet connected, small device (or beside apparatus 15) that simply confirms and identifies the package delivery near/proximate to the device. In this scenario, it should be noted that, the onus is on the customer to retrieve the item immediately in such an unsecured delivery scenario. The RFID tag or equivalent radio frequency tag on the parcel/item to be delivered is operably able to communicate with the stand-alone, Internet and network connected, small device 25 when it is within a desired, pre-set range, which be varied as needed. The device 25, in such circumstance, can identify the parcel/item to be delivered and, based on what was described previously herein, is able to ascertain exactly what the parcel/item 17 being delivered is, where came from, and who it is to be delivered to (in the exact same manner for deliveries placed within or proximate to the apparatus 15, as previously described herein). In this situation, the customer 3 and shipper are notified of the successful delivery and that the item itself has been delivered unsecured, and is not in a container, but rather in proximity to the device 25, as noted in FIG. 4.

The device 25 itself would comprise numerous lights and visual markers indicating activation, on/off status, whether a package is present, or whether surveillance is activated, for example, though it will be understood numerous variations to this are possible. The device can also, if desired, possess a push button option 29, which can be activated either physically on the device itself or remotely, which would then activate the device 25 to notify the customer 3 and shipper that the item 17 is present.

As can be seen in FIG. 3, the device 25 is wall mounted outside of a residence so as to be in proximity to the apparatus 15. However, configurations of the device, and placements thereof, can be numerous and varied, as would be apparent to one skilled in the art.

The device 25 can also emit, for example, an intermittent, continuous signal (such as beeping) indicating that the externally placed package is still within the desired range of the device. Such desired range determination could be effected by means of a proximity sensor located on the device 25. In the event that this externally placed package is removed by anyone not having or utilizing the previously described means of access to the delivered package, then an alarm (audible and/or otherwise) will sound and the customer and shipper of the item will be immediately advised. In a still further embodiment, the device 25 also optionally includes a voice recognition component (as would be understood by one skilled in the art) that could be provided to at least one of the device 25 or the apparatus 15, whereby electronic handshake communication between the device, the apparatus 15, and associated other devices involved in the system can be activated through a voice command code. One skilled in the art would recognize that electronic handshake communication entails signals being exchanged between devices to establish a communication link.

It will also be understood that the delivery system of the present invention, and apparatus and device therefore, could be implemented and utilized through use of "blockchain" or bluetooth technology. Of course, in this embodiment, it would be understood by one skilled in the art that a "blockchain" is a decentralized, distributed and public digital ledger used to record transactions across many computers so that any involved record cannot be altered retroactively, without the alteration of all subsequent blocks. Such a system would allow the participants to verify and audit transactions independently and relatively inexpensively, and the blockchain database could be managed autonomously using a peer-to-peer network and a distributed timestamping server.

In a still further embodiment, the delivery system of the present invention, and apparatus and device therefore, may feature lights and/or sounds that indicate the readiness of the apparatus to accept packages, and to indicate whether or not a package has been secured. In a further embodiment, the system and apparatus may also be utilized have a scale function associated therewith to provide confirmation of a package's weight.

In a still further embodiment, the device 25 further entails a "return to shipper" option, whereby customers returning items to the shipper would have the device 25, through either itself or by means of a network connection to a printer, print off a bar code to be placed on the to be returned package. In addition, the apparatus 15 itself can also provide the same function. In this "return to sender" scenario, the bar code would be scanned and any of the device 25 or apparatus 15 would notify the shipper to arrange for pickup of the item 17. It will be understood that, in addition to a bar code, various other utilizations could be effected, such as a label, a QR code, a datamatrix code, or other machine readable optical labels that contain information about the item to which it is attached, or other contemplations, as would be apparent to one skilled in the art.

In a still further embodiment of the present invention, the device 25 (or apparatus 15), provides a feature, for example, whereby home residences or home based businesses would be able to ship from their doorstep. In this scenario, either of these devices would facilitate that a label be printed off, either on their own or over the Internet connection/network, and attached to a package to be delivered. The device 25 (or apparatus 15) would scan and read the label, the courier or delivery service would be automatically notified, and the package would then be picked up.

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. An automated package delivery system utilizing a device comprising the steps of:
    delivering an item to a purchaser accessible entity for a purchaser of the item, the purchaser accessible entity and the device being constructed and arranged to be accessible over a network and in communication with each other;
    delivering to at least each of the purchaser and a shipper of the item a confirmation of the delivery of the item over the network; and
    wherein, when the item to be delivered exceeds a capacity of the purchaser accessible entity to be stored therein, the item can be positioned proximate to the purchaser accessible entity and detectable by the device, and the purchaser and the shipper of the item are notified of the non-secure delivery of the item over the network when within a pre-set range.

2. The system of claim 1, wherein the pre-set range is under 5 Feet or 1.5 meters.

3. The system of claim 1, wherein the system further comprises the step of the device delivering to at least each of the purchaser and the shipper of the item an image from a camera in communication with the network to provide a visual proof of the delivery of the item.

4. The system of claim 1, wherein the system further comprises the step of providing the item with an RFID (radio frequency identification) tracking tag.

5. The system of claim 1, wherein the system further comprises the step of providing the item with a combination of an RFID tracking tag and NFC tracking tag (near field communication).

6. The system of claim 5, wherein the system further comprises the step of providing tracking information based on the tracking tags to each of the purchaser and the shipper.

7. The system of claim 1, wherein the system further comprises the step of providing the purchaser, through at least one of the device or the purchaser accessible entity via the network, an option to signify to the shipper that the item is to be returned.

8. The system of claim 7, wherein, when the item is to be returned to the shipper, a tracking tag is printed off to be placed on the item, which is then scanned and forwarded to the shipper to signify that the delivery item is to be picked up and returned, the tracking tag being selected from the group consisting of an RFID (radio frequency identification) tracking tag, a barcode, a Datamatrix code, a label, a QR code, or machine-readable optical labels, which is then scanned and forwarded to the shipper to signify that the item is to be picked up and returned.

9. The system of claim 1, wherein the system further comprises the step of providing the device with a push button component which can be activated physically on the device itself or remotely, which would then activate the device to notify the purchaser and the shipper that the item has been delivered.

10. A kit for providing an automated package delivery system comprising:
    a purchaser accessible entity for a purchaser of a delivery item;
    a device for confirming delivery of the delivery item to the purchaser accessible entity at a site proximate to the purchaser accessible entity, the purchaser accessible entity and the device being constructed and arranged to be accessible over a network and in communication with each other, and being operably able to deliver to at least each of the purchaser and a shipper of the delivery item a confirmation of the delivery item over the network; and
    wherein, when the delivery item to be delivered exceeds a capacity of the purchaser accessible entity to be stored therein, the delivery item can be positioned proximate to the purchaser accessible entity and detectable by the device, and the purchaser and the shipper of the delivery item are notified of the non-secure delivery of the delivery item over the network when within a pre-set range.

11. The kit of claim 10, wherein the device further comprises:
    a processor, the network being in communication with the processor; and
    a confirmation module in communication with the processor and the network for delivering to at least each of the purchaser and the shipper of the delivery item a confirmation of delivery of the delivery item to a site proximate to the to the purchaser accessible entity.

12. The kit of claim 10, wherein the device further comprises a push button component which can be activated physically on the device itself or remotely, which would then activate the device to notify the purchaser and the shipper that the delivery item has been delivered.

13. The kit of claim 10, wherein, when the item is to be returned to the shipper, the device or the purchaser accessible entity ensures that a tracking tag is printed off to be placed on the delivery item, which is then scanned and forwarded to the shipper to signify that the delivery item is to be picked up and returned, the tracking tag being selected from the group consisting of an RFID (radio frequency identification) tracking tag, a barcode, a Datamatrix code, a label, a QR code, or machine-readable optical labels.

\* \* \* \* \*